United States Patent
Patil et al.

(10) Patent No.: US 10,111,204 B2
(45) Date of Patent: Oct. 23, 2018

(54) SCHEDULING ASSIGNMENT TRANSMISSIONS IN DEVICE-TO-DEVICE COMMUNICATIONS

(71) Applicant: QUALCOMM Incorporated, San Diego, CA (US)

(72) Inventors: Shailesh Patil, Raritan, NJ (US); Saurabha Rangrao Tavildar, Jersey City, NJ (US); Sudhir Kumar Baghel, Bridgewater, NJ (US); Kapil Gulati, Franklin Park, NJ (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 15/181,204

(22) Filed: Jun. 13, 2016

(65) Prior Publication Data
US 2017/0006580 A1    Jan. 5, 2017

Related U.S. Application Data

(60) Provisional application No. 62/188,302, filed on Jul. 2, 2015.

(51) Int. Cl.
*H04W 72/02* (2009.01)
*H04W 74/08* (2009.01)
(Continued)

(52) U.S. Cl.
CPC ........... *H04W 72/02* (2013.01); *H04L 5/0007* (2013.01); *H04W 72/0446* (2013.01);
(Continued)

(58) Field of Classification Search
CPC ............. H04W 72/02; H04W 72/0446; H04W 72/1226; H04W 72/1289; H04L 5/0007
See application file for complete search history.

(56) References Cited

U.S. PATENT DOCUMENTS

| 2009/0034465 A1* | 2/2009 | Papasakellariou .... H04L 5/0037 370/329 |
| 2015/0282210 A1* | 10/2015 | Li ....................... H04W 74/004 455/436 |

FOREIGN PATENT DOCUMENTS

WO    WO-2015065281 A1    5/2015

OTHER PUBLICATIONS

Nokia Corporation, "Patterns for Scheduling Assignments," 3GPP TSG-RAN WG1 Meeting #78, R1-143247, Dresden, Germany, Aug. 18-22, 2014, 4 pages, XP050788723, 3rd Generation Partnership Project.*

(Continued)

*Primary Examiner* — Jamal Javaid
(74) *Attorney, Agent, or Firm* — Clint R. Morin; Holland & Hart

(57) ABSTRACT

Techniques for scheduling assignment (SA) transmissions in device-to-device (D2D) communications are described. A D2D user equipment (UE) may use a block of time resources for SA transmissions. A D2D UE may transmit an SA transmission relatively quickly after determining that D2D data is to be transmitted to another D2D UE, relative to having to wait for specified time resources to send an SA transmission. The D2D data may then be transmitted following the SA transmission, reducing latency for transmission of the D2D data. It may be desirable for vehicle-to-vehicle (V2V) transmissions to have a relatively low latency to provide data from one vehicle to another with sufficient time for a vehicle to take action while moving at relatively high rates of speed.

27 Claims, 14 Drawing Sheets

(51) Int. Cl.
*H04L 5/00* (2006.01)
*H04W 72/04* (2009.01)
*H04W 72/12* (2009.01)

(52) U.S. Cl.
CPC ... *H04W 72/1226* (2013.01); *H04W 72/1289* (2013.01); *H04W 74/08* (2013.01)

(56) References Cited

OTHER PUBLICATIONS

Alcatel-Lucent Shanghai Bell et al., "Resource Allocation and Selection for Scheduling Assignment for D2D Communication," 3GPP TSG RAN WG1 Meeting #78, R1-143019, Dresden, Germany, Aug. 18-22, 2014, 5 pgs., XP050788499, 3rd Generation Partnership Project.

Alcatel-Lucent Shanghai Bell et al., "Resource Allocation for Scheduling Assignment," 3GPP TSG RAN WG1 Meeting #77, R1-142574, Seoul, Korea, May 19-23, 2014, 6 pgs., XP050814942, 3rd Generation Partnership Project.

Asustek, "Discussion of D2D Mode 2 SA Resource Allocation," 3GPP TSG RAN WG1 Meeting #78, R1-143345, Dresden, Germany, Aug. 18-22, 2014, 4 pgs., XP050788818, 3rd Generation Partnership Project.

Ericsson, "D2D Scheduling Procedure," 3GPP TSG-RAN WG2 Meeting #84, R1-134238, San Francisco, USA, Nov. 11-15, 2013, 7 pgs., XP050736985, 3rd Generation Partnership Project.

Ericsson, "On Scheduling Procedure for D2D," 3GPP TSG-RAN WG1 Meeting #76, R1-140778, Prague, Czech Republic, Feb. 10-14, 2014, 5 pgs., XP050736279, 3rd Generation Partnership Project.

ISA/EP, International Search Report and Written Opinion of the International Searching Authority, Int'l Application No. PCT/US2016/037379, Sep. 2, 2016, European Patent Office, Rijswijk, NL, 15 pgs.

Nokia Corporation et al., "Patterns for Scheduling Assignments", 3GPP TSG-RAN WG1 Meeting #78, R1-143247, Dresden, Germany, Aug. 18-22, 2014, 4 pgs., XP050788723, 3rd Generation Partnership Project.

* cited by examiner

SCHEDULING ASSIGNMENT TRANSMISSIONS IN DEVICE-TO-DEVICE COMMUNICATIONS

CROSS REFERENCES

The present Application for Patent claims priority to U.S. Provisional Patent Application No. 62/188,302 by Patil et al., entitled "Scheduling Assignment Transmissions in Device-to-Device Communications," filed Jul. 2, 2015, assigned to the assignee hereof.

BACKGROUND

The following relates generally to wireless communication, and more specifically to scheduling assignment (SA) transmissions in device-to-device (D2D) communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communication system may include a number of base stations, each simultaneously supporting communication for multiple communication devices, otherwise known as user equipment (UE). A base station may communicate with UEs on downlink channels (e.g., for transmissions from a base station to a UE) and uplink channels (e.g., for transmissions from a UE to a base station). UEs may communicate directly with each other using D2D communications over a direct D2D wireless link.

Various implementations provide for D2D communications in band(s) of a licensed frequency spectrum, an unlicensed frequency spectrum, or combinations thereof. Communications in the unlicensed frequency spectrum band, however, may comply with various requirements regarding resource utilization, medium access procedures, etc. Moreover, D2D communications have established protocols that may, at times, result in relatively long latency of reception of packets. For many D2D UEs communications may be relatively latency insensitive. In cases where communications are sensitive to latency, however, such relatively long latency may be undesirable.

SUMMARY

The present disclosure, for example, relates to techniques for scheduling assignment (SA) transmissions in device-to-device (D2D) communications. Various aspects of the disclosure provide that a D2D user equipment (UE) may use an entire block of time resources for SA transmissions, rather than only a subset of an entire block of time resources. A D2D UE may thus transmit an SA transmission relatively quickly after determining that D2D data is to be transmitted to another D2D UE, relative to having to wait for specified time resources to send an SA transmission. The D2D data may then be transmitted following the SA transmission, thereby reducing latency for transmission of the D2D data. Such reduced latency may be desirable for applications that, for safety purposes, may rely on relatively low latency communications. For example, it may be desirable for vehicle-to-vehicle (V2V) transmissions to have a relatively low latency in order to provide data from one vehicle to another with sufficient time for a vehicle to take action while moving at relatively high rates of speed.

In some examples, a D2D UE may identify time resources for D2D data and SA transmissions, in which the time resources for the SA transmissions may be selected from any time resources from an available block of time resources. D2D UEs may, in some examples, complete two SA transmissions prior to transmitting D2D data. The two SA transmissions may be completed based on a predefined relationship between the block of time resources and the SA transmissions, in the absence of periodic SA transmissions. The SA transmission(s) may include, in some examples, a bitmap indicating time resources following the SA transmission that are to be used for the D2D data transmissions. In certain examples, a D2D UE may detect other SA transmissions of other D2D UEs, and use information from such other SA transmissions to select time resources for transmitting an SA that will not collide with the other UE transmissions.

A method of wireless communication is described. The method may include identifying a block of time resources for D2D data transmissions and SA transmissions, identifying a predefined relationship between the block of time resources and the SA transmissions, in the absence of periodic SA transmissions, selecting, from the entire block of time resources, a subset of the time resources for transmitting an SA, and transmitting the SA transmissions using the subset of time resources and according to the predefined relationship.

An apparatus for wireless communication is described. The apparatus may include means for identifying a block of time resources for D2D data transmissions and SA transmissions, means for identifying a predefined relationship between the block of time resources and the SA transmissions, in the absence of periodic SA transmissions, means for selecting, from the entire block of time resources, a subset of the time resources for transmitting an SA, and means for transmitting the SA transmissions using the subset of the time resources and according to the predefined relationship.

A further apparatus for wireless communication is described. The apparatus may include a processor, memory in electronic communication with the processor, and instructions stored in the memory and operable, when executed by the processor, to cause the apparatus to identify a block of time resources for D2D data transmissions and SA transmissions, identify a predefined relationship between the block of time resources and the SA transmissions, in the absence of periodic SA transmissions, select, from the entire block of time resources, a subset of the time resources for transmitting an SA, and transmit the SA transmissions using the subset of the time resources and according to the predefined relationship.

A non-transitory computer-readable medium storing code for wireless communication is described. The code may include instructions executable to identify a block of time resources for D2D data transmissions and SA transmissions, identify a predefined relationship between the block of time resources and the SA transmissions, in the absence of periodic SA transmissions, select, from the entire block of time resources, a subset of the time resources for transmitting an SA, and transmit the SA transmissions using the subset of the time resources and according to the predefined relationship.

Some examples of the method, apparatuses, or non-transitory computer-readable medium described herein may further include processes, features, means, or instructions for identifying a set of frequency resources for the D2D data transmissions and the SA transmissions, and selecting a subset of the frequency resources for transmitting the SA, wherein the subset of the frequency resources are located within defined segments of the set of frequency resources. Additionally or alternatively, in some examples the subset of frequency resources comprises a first subset of frequency resources for transmitting a first SA transmission and a second subset of frequency resources for transmitting a second SA transmission.

Some examples of the method, apparatuses, or non-transitory computer-readable medium described herein may further include processes, features, means, or instructions for transmitting the first SA transmission using the first subset of frequency resources, and transmitting the second SA transmission using the second subset of frequency resources. Additionally or alternatively, in some examples the second SA transmission is a retransmission of the first SA transmission.

In some examples of the method, apparatuses, or non-transitory computer-readable medium described herein, the second subset of frequency resources is determined based at least in part on a defined relationship between the first subset of frequency resources and the second set of frequency resources. Additionally or alternatively, in some examples the set of frequency resources comprises a plurality of frequency sub-bands and the first subset of frequency resources are located in a first subset of the plurality of frequency sub-bands, and wherein the second subset of frequency resources are located in a second subset of the plurality of frequency sub-bands that is different than the first subset of the plurality of frequency sub-bands.

In some examples of the method, apparatuses, or non-transitory computer-readable medium described herein, the set of frequency resources comprises a plurality of resource blocks and the first subset of frequency resources are located in a first subset of the plurality of resource blocks, and wherein the second subset of frequency resources are located in a second subset of the plurality of resource blocks that is different than the first subset of the plurality of resource blocks. Additionally or alternatively, in some examples the first subset of frequency resources are located in even-numbered resource blocks and the second subset of frequency resources are located in odd-numbered resource blocks.

Some examples of the method, apparatuses, or non-transitory computer-readable medium described herein may further include processes, features, means, or instructions for transmitting the SA, wherein the SA includes a bitmap indicating time resources following the SA transmission that are to be used for the D2D data transmissions. Additionally or alternatively, in some examples the bitmap applies to the first subframe following a last SA transmission.

In some examples of the method, apparatuses, or non-transitory computer-readable medium described herein, the bitmap comprises a defined number of bits, and wherein the transmission of the bitmap is repeated when the number of transmissions extend beyond time resources identified in the bitmap. Additionally or alternatively, in some examples the bitmap applies an offset after a last SA transmission for initiation of transmissions that are to be used to transmit the D2D data.

In some examples of the method, apparatuses, or non-transitory computer-readable medium described herein, the SA indicates a number of transmissions of the D2D data and the bitmap indicates time resources for each of the transmissions of the D2D data. Additionally or alternatively, some examples may include processes, features, means, or instructions for detecting other SA transmissions of at least one D2D user equipment (UE), and wherein selecting the subset of the time resources for transmitting the SA comprises selecting resources other than resources indicated by the other SA transmissions. Additionally or alternatively, identifying the predefined relationship between the block of time resources and the SA transmissions may be based at least in part on the resources indicated by the other SA transmissions.

In some examples of the method, apparatuses, or non-transitory computer-readable medium described herein, the predefined relationship between the block of time resources and the SA transmissions may be signaled by a base station.

In some examples of the method, apparatuses, or non-transitory computer-readable medium described herein, the D2D data transmissions and SA transmissions are V2V communications.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
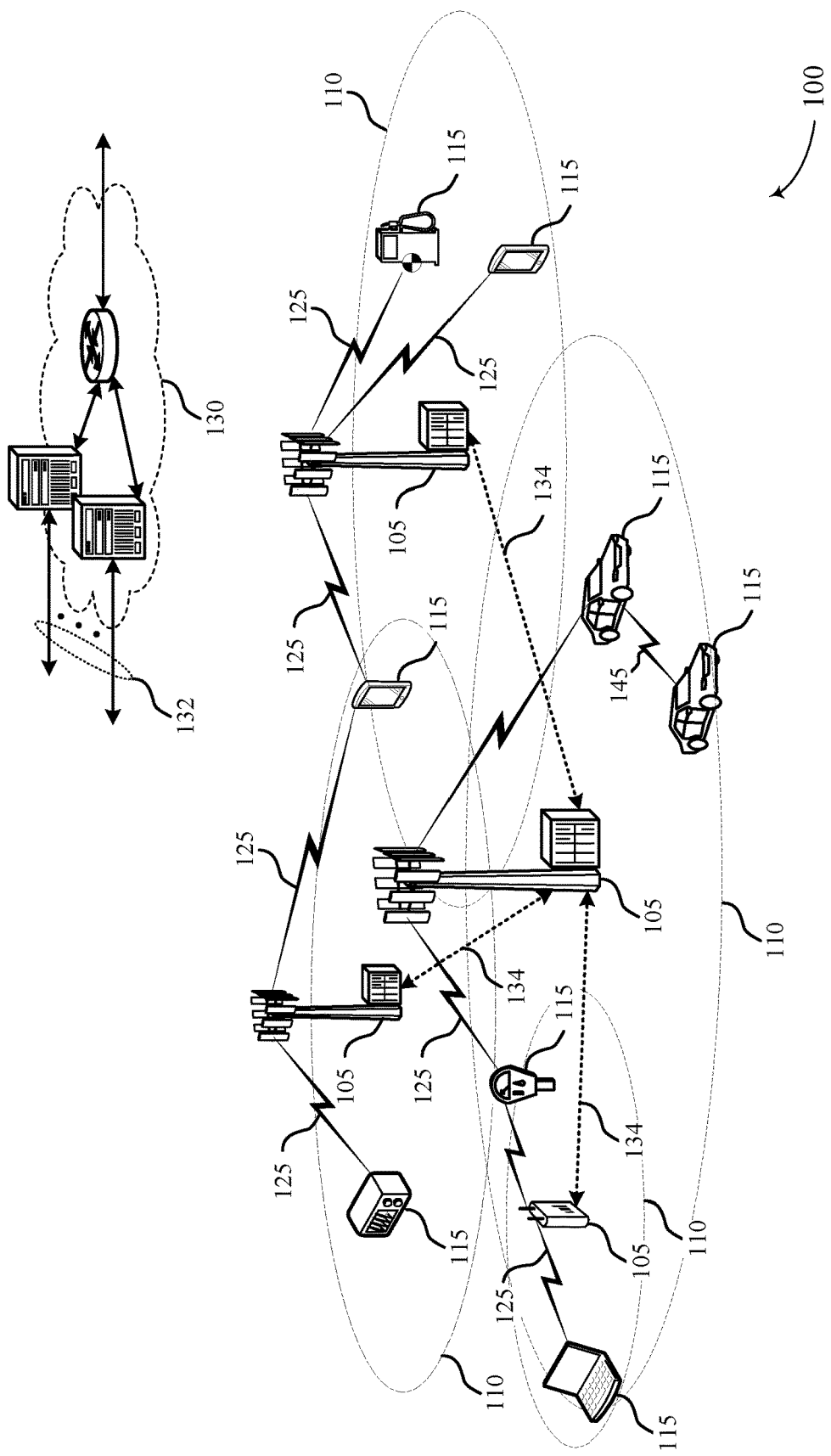
FIG. 1 illustrates an example of a wireless communications system that supports scheduling assignment transmissions in device-to-device communications in accordance with various aspects of the present disclosure.

Techniques are described in which a device-to-device (D2D) user equipment (UE) may use an entire block of time resources for scheduling assignment (SA) transmissions, rather than only a subset of an entire block of time resources. As mentioned above, in some deployments D2D devices traditionally have certain subframes of radio frame transmissions that may be used for SA transmissions. For example, in some deployments eight subframes of a D2D radio frame may be designated for SA transmissions, followed by a number of subframes designated for D2D data transmissions. In some examples, a UE may transmit an SA once every 40 ms, and in cases where an SA is transmitted two times, it may be 80 ms before the UE transmits D2D data. As mentioned, in some applications such latency may be undesirable due to safety considerations. For example, in V2V communications it may be beneficial to provide transmission and reception of a packet within 100 ms, in order to help provide data between vehicles with additional time for a vehicle to take action based on received data. Some proposals for V2V communications are proposing an overall latency of reception of a packet of 100 ms or less, and that packets should be decodable within a few hundred meters with high reliability. Waiting for SA transmission windows under such proposals may result in higher likelihood that such overall latency may not be achieved for some packets. Furthermore, some D2D UEs may transmit using half-duplex, which may result in packets not being received by a receiving UE if both the transmitting UE and receiving UE use a same time resource for SA or data transmissions.

The present disclosure provides, in various aspects, that a D2D UE may transmit an SA transmission relatively quickly after determining that D2D data is to be transmitted to another D2D UE, relative to having to wait for specified time resources to send an SA transmission. The D2D data may then be transmitted following the SA transmission, thereby reducing latency for transmission of the D2D data. In some examples, a D2D UE may identify time resources for D2D data and SA transmissions, in which the time resources for the SA transmissions may be selected from any time resources from an available block of time resources, e.g., there is no notion of periodic SA time resources. D2D UEs may, in some examples, complete two SA transmissions prior to transmitting D2D data. The SA transmissions may be in accordance with a predefined relationship between the time resources and the SA transmissions. The SA transmission(s) may include, in some examples, a bitmap indicating time resources following the SA transmission that are to be used for the D2D data transmissions. In certain examples, a D2D UE may detect other SA transmissions of other D2D UEs, and use information from such other SA transmissions to select time resources for transmitting an SA that will not collide with the other UE transmissions. Additionally, techniques as discussed herein also may reduce the likelihood of two UEs transmitting an SA on a given time resource, and thus reduces the likelihood of collisions on D2D transmissions.

Aspects of the disclosure are initially described in the context of a wireless communication system. Specific examples are then described for D2D communications. These and other aspects of the disclosure are further illustrated by and described with reference to apparatus diagrams, system diagrams, and flowcharts that relate to scheduling assignment transmissions in device-to-device communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communication links 145 may also be established between UEs 115 in a configuration known as D2D communications. One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group.

In some cases, a base station 105 facilitates the scheduling of resources for D2D communications. In other cases, D2D communications are carried out independent of a base station 105. D2D communications directly between two UEs 115 may be referred to as one-hop D2D communication. D2D communication between two UEs 115 through a relay (e.g., another UE 115 between a transmitting UE and a receiving UE) may be referred to as two-hop D2D communication.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, pico eNBs, femto eNBs, relays, and the like. A UE 115 may be able to communicate with other UEs 115 directly, or through a relay, using D2D communications.

As discussed above, in some aspects of the present disclosure a UE 115 may identify time resources for D2D data and SA transmissions, in which the time resources for the SA transmissions may be selected from any time resources from an available block of time resources. Various exemplary techniques for D2D SA and data transmissions are discussed with reference to FIGS. 2-14.

Figure 2:
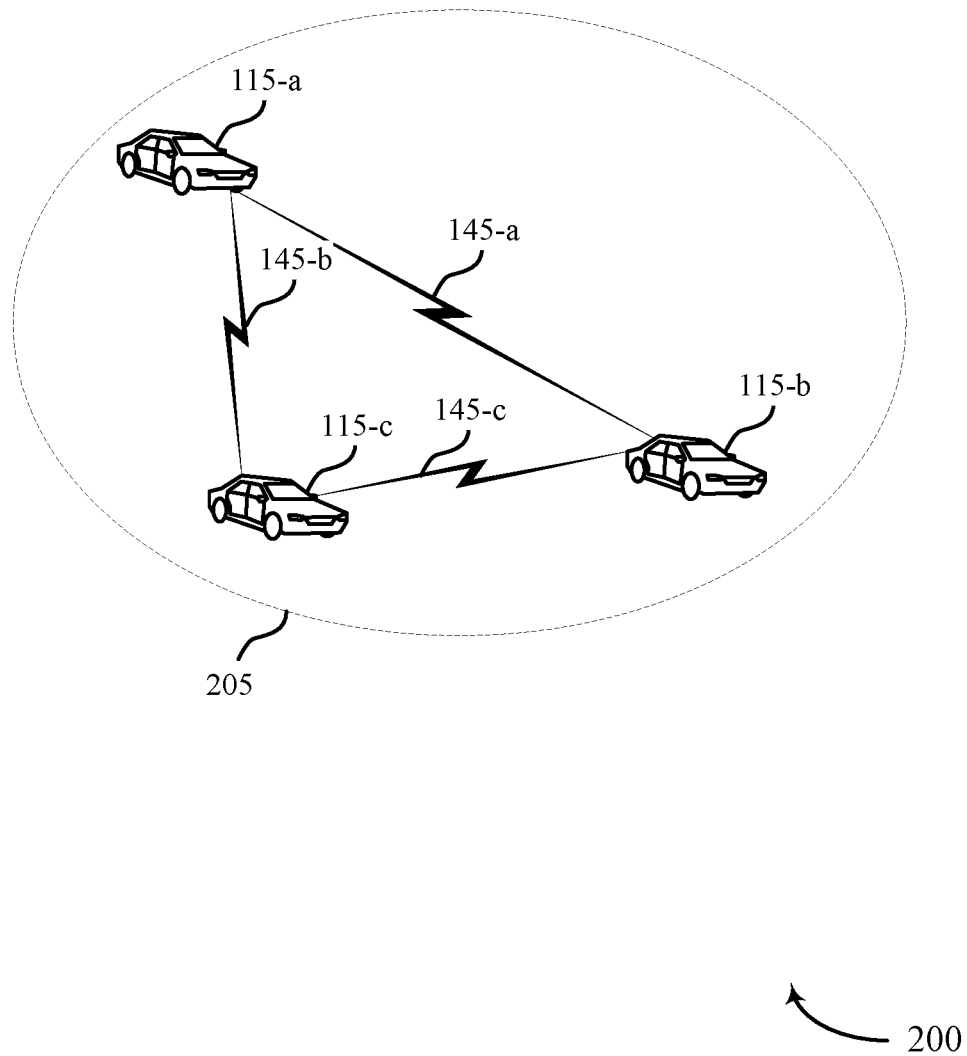
FIG. 2 illustrates an example of a wireless communications subsystem that supports scheduling assignment transmissions in device-to-device communications in accordance with various aspects of the present disclosure.

FIG. 2 illustrates an example of a wireless communications subsystem 200 for scheduling assignment transmissions in device-to-device communications in accordance with various aspects of the present disclosure. Wireless communications subsystem 200 may include a first D2D UE 115-a, a second D2D UE 115-b, and a third D2D UE 115-c, which may be examples of a UE 115 described with reference to FIG. 1. First D2D UE 115-a may have a coverage area 205, and communicate with second D2D UE 115-b and third D2D UE 115-c via communication links 145-a and 145-b, respectively. Additionally, second D2D UE 115-b and third D2D UE 115-c may communicate via communication link 145-c. Communication links 145 may use a shared channel in a shared (e.g., unlicensed) radio frequency spectrum band, may use a dedicated (e.g., licensed) radio frequency spectrum band, or may use combinations thereof.

In the example of FIG. 2, D2D UEs 115 may be vehicular devices that may transmit data related to a vehicle's operation. For example, second D2D UE 115-b may provide information related to the vehicle's speed and any change of the vehicles direction, speed, or combinations thereof. If the second D2D UE 115-b determines that the vehicle is braking, the second D2D UE 115-b may transmit such information to other D2D UEs 115, which may alert their respective operators or take autonomous action. Given that vehicles may be traveling at relatively high speeds on a highway, is may be desirable to provide such information with relatively low latency in order to provide enhanced response time to other vehicles. As discussed above, D2D UEs 115 according to various aspects of the disclosure may transmit SA transmissions and data transmissions with relatively low latency. In some examples, SA resources may be selected from all available time resources being used for D2D communication. In case of dedicated spectrum for such D2D communications, this means that all time resources may be available for D2D SA transmissions or data transmissions. Such techniques may provide reduced latency relative to systems that provide dedicated time resources and/or periodic scheduling for SA transmissions.

Figure 3:
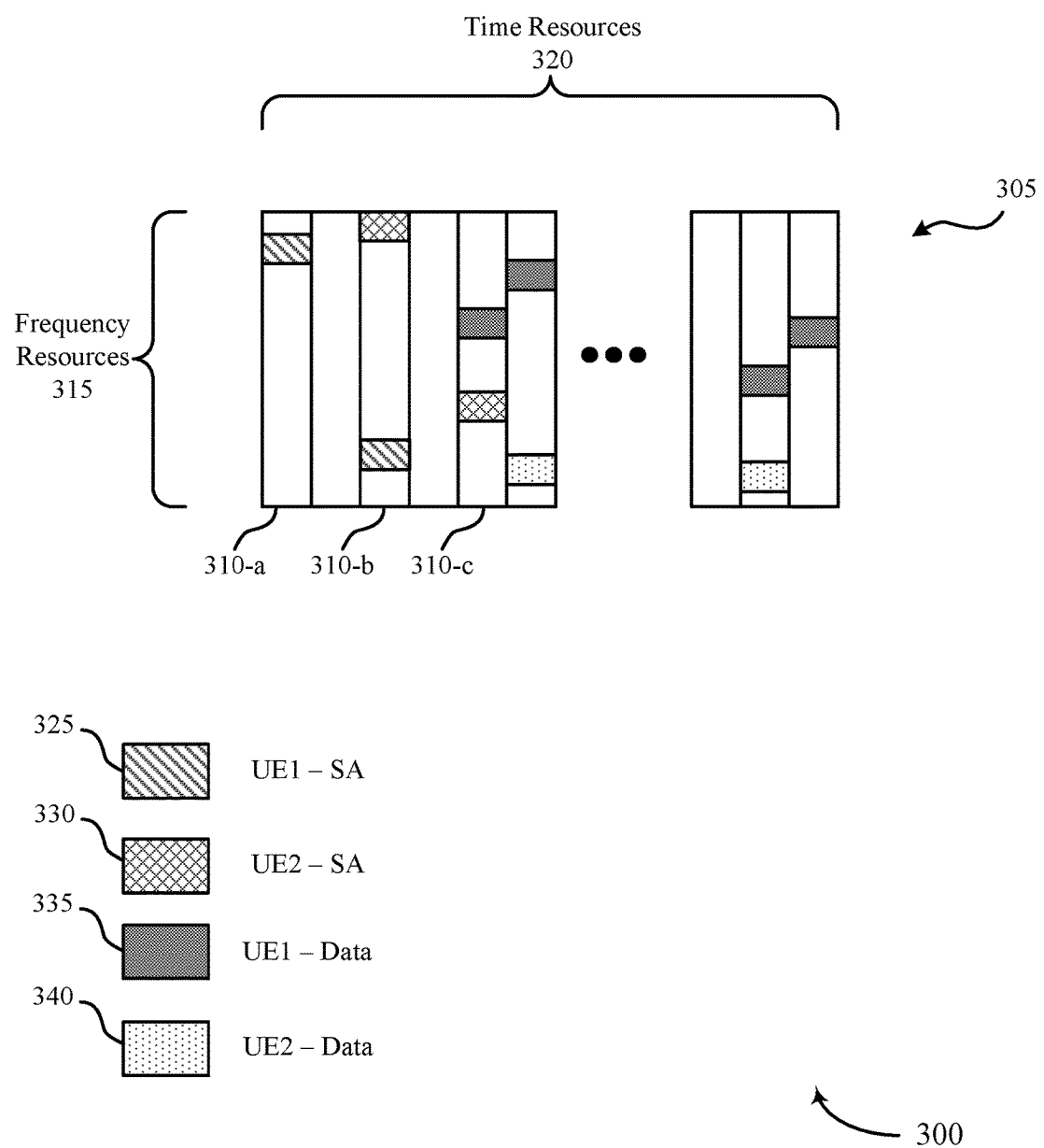
FIG. 3 illustrates an example of device-to-device transmission resources that support scheduling assignment transmissions in device-to-device communications in accordance with various aspects of the present disclosure.

FIG. 3 illustrates an example of D2D transmission resources 300 that support scheduling assignment transmissions in D2D communications in accordance with various aspects of the present disclosure. D2D transmission resources 300 may be used for SA transmissions and data transmissions between D2D UEs, and for transmissions between UEs and base stations, such as UEs 115 and base stations 105 described with reference to FIGS. 1-2. D2D transmission resources 300 may include, in the example of FIG. 3, radio frame resources 305 which may include a number of subframes 310. Each subframe 310 may occupy a certain amount of time and thus time resources 320 may be made up of a number of available subframes 310. Each subframe 310 may include a number of resource blocks (RBs) that may occupy different frequency resources 315. For example, an RB may be transmitted using a frequency sub-band or set of tones. As discussed above, SA transmissions according to various examples may be transmitted using time resources 320 that may span the entire block of time resources 320. Likewise, data transmissions according to various examples may be transmitted using time resources 320 that may span the entire block of time resources 320.

In some examples, certain frequency resources 315 may be designated for SA transmissions. In this manner, a D2D UE may monitor certain frequency resources for SA transmissions, and may not monitor other frequency resources until an SA transmission indicates that data is to be transmitted using the other resources. Furthermore, as mentioned above, in some examples D2D UEs may transmit two separate SA transmissions. Such transmissions may be located in different frequency resource pools, and thus if a first SA transmission is received a D2D UE may know to look in a specific location for the second SA transmission and may combine the two transmissions, in some examples, to provide enhanced likelihood of successfully receiving and decoding the information in the SA transmissions.

In some examples, a D2D UE may transmit SA transmissions according to a predefined relationship between the SA transmissions and time resources 320. The predefined relationship may include the timing or separation of the two separate SA transmissions. The predefined relationship may be known a priori by the D2D UE, may be signaled by a base station, and/or may be based on the D2D UE monitoring other SA transmissions. For example, the predefined relationship may include which subframe a second SA is transmitted after a first SA is transmitted, which frequency band the first and second SAs are transmitted in, etc. Thus, the predefined relationship may indicate the parameters the D2D UE uses for the SA transmission.

In the example of FIG. 3, a first UE may transmit SA transmissions 325 in subframes 310-a and 310-b, and a second UE may transmit SA transmissions 330 in subframes 310-b and 310-c. The relationship between subframes 310 of first and second SA transmissions may be specified, or may be semi-statically signaled by a base station, for example. Similarly, the relationship between frequency resources 315 used for first and second SA transmissions may be specified, based on a channel bandwidth, or semi-statically signaled by a base station, for example. Thus, the relationship between subframes 310 and/or between frequency resources 315 may be identified by the D2D UE according to the predefined relationship. As the example of FIG. 3 provides no specified SA time resource period, a receiver UE may not distinguish between a first and second SA transmission. As discussed above, in some examples, a first SA transmission may occur on a subset of frequency resources 315, and the second SA transmission may occur on a different subset of frequency resources 315. For example, a first SA transmission may occur on a first half of the frequency resources 315 while the second SA transmission may occur on a second half of the frequency resources 315. Another example is that the first SA transmission may occur on even RBs while second SA transmission may occur on odd RBs. Following the SA transmissions 325 of the first UE, first UE data 335 may be transmitted according to the information in the first UE SA transmissions 325. Similarly, following the SA transmissions 330 of the second UE, second UE data 340 may be transmitted according to the information in the second UE SA transmissions 330. As mentioned above, because a UE is capable of selecting any of the time resources 320 for an initial SA transmissions, latency may be reduced. Furthermore, since the likelihood of two UEs transmitting on a given SA subframe is reduced, the likelihood of a data collision on transmissions is also reduced.

Once a UE has transmitted SA, D2D data transmissions may be transmitted. In some examples, the SA transmissions 325, 330 may include a bitmap, (e.g., a T-RPT bitmap), which may indicate subframes that include D2D data transmissions. In some examples, transmission of D2D data may start with the subframe 310 following the last SA transmission. In other examples, transmission of D2D data may start after an offset following the last sub-frame of the SA transmission. Such an offset may be included as part of the SA transmission itself or may be a specified offset. In some examples, each bit of the bitmap may correspond to a subframe, and a logical one in the bitmap may indicate a D2D data transmission will occur while a logical zero may indicate no D2D transmission. In some examples, SA transmissions may also indicate a number of transmissions of D2D data. For example, an SA transmission may indicate that D2D data will be transmitted four times. In the event that the bitmap does not provide information for enough subframes to indicate all of the D2D data transmissions, the bitmap transmission may be repeated sufficient times such that the target number of transmissions is achieved. For example if the bitmap pattern is 00001010 and the number of transmissions is 4 then the bitmap pattern may be repeated twice. As both D2D data and SA transmissions may occupy same time resources, there may be instances where an SA transmission and a D2D data transmissions may collide. In some examples, a D2D UE may monitor SA transmissions of other D2D UEs. The D2D UE may decode the SA transmissions from the other UEs and may determine future sub-frames that are scheduled to be used data transmissions and potentially second SA transmissions. The D2D UE may, when selecting its resource to transmit SA and data, try to avoid those resources that are already scheduled.

Figure 4:
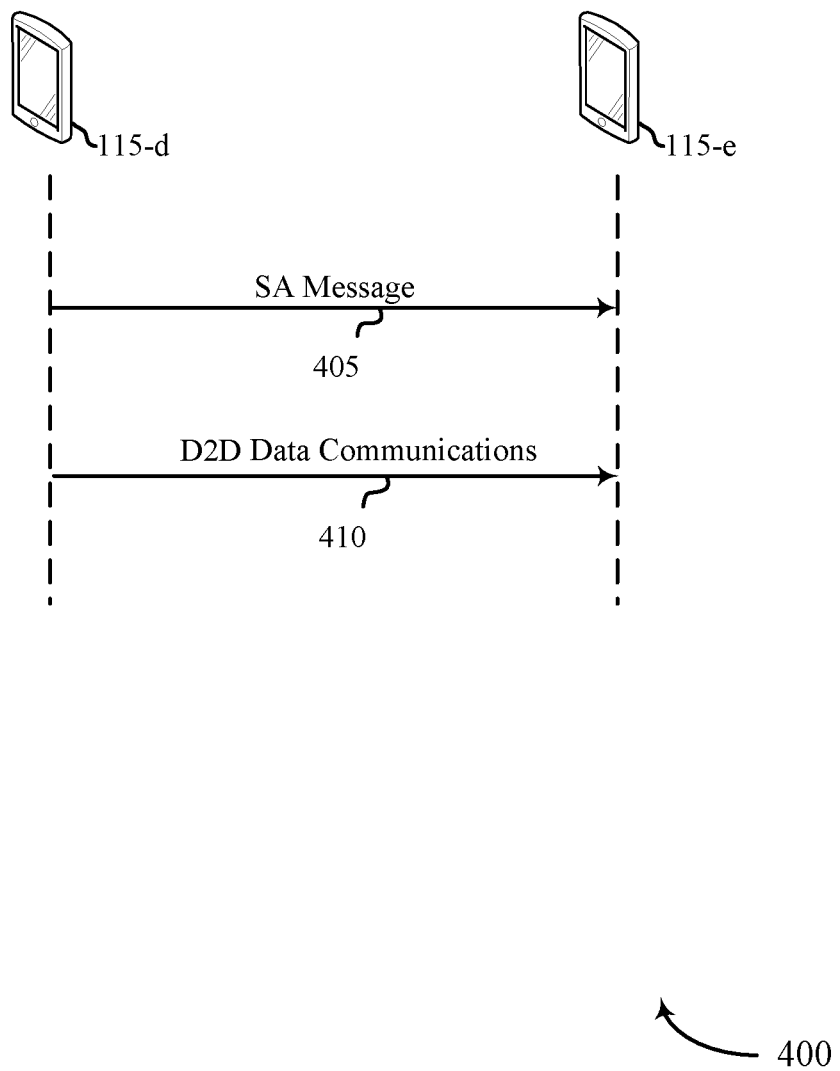
FIG. 4 illustrates an example of a process flow that supports scheduling assignment transmissions in device-to-device communications in accordance with various aspects of the present disclosure.

FIG. 4 illustrates an example of a process flow 400 for SA transmissions in D2D communications in accordance with various aspects of the present disclosure. Process flow 400 may include a first UE 115-d and a second UE 115-e, which may be examples of UEs 115 described with reference to FIGS. 1-3. In some examples, a system device, such as one of the UEs 115 may execute one or more sets of codes to control the functional elements of the device to perform some or all of the functions described below.

At 405, the first UE 115-d may transmit an SA message to the second UE 115-e. The SA message may be associated with D2D data communication. The SA message may convey an indication of a timing component, a frequency component, a MCS component, and the like, for the D2D data communications. For example, as mentioned above, the SA message may include a field called T-RPT (time domain resource pattern of transmission). The T-RPT field may be a number mapped to a bitmap indicating the subframes to be used for D2D data transmissions. Accordingly, the second UE 115-e may receive the SA message and know where to look and/or how to properly decode the D2D data communications.

At 410, the first UE 115-d may transmit a D2D data communication to the second UE 115-e. The D2D data communication may be transmitted in accordance with the SA message, e.g., on the frequency, at the time, using the MCS, etc., as indicated in the SA message. In some examples, the D2D data communications may be transmitted in a set of sub-frames. The set of sub-frames may include one group, or multiple groups of sub-frames. The group(s) of sub-frames in the set of sub-frames may be sequential, in some examples.

Although the example illustrated in FIG. 4 shows the first UE 115-d transmitting the SA message and the D2D data communications to the second UE 115-e, it is to be understood that transmission of the SA message and/or the D2D data communications may be broadcast or multicast such that more than one UE 115 may receive the transmissions at the same time.

Figure 5:
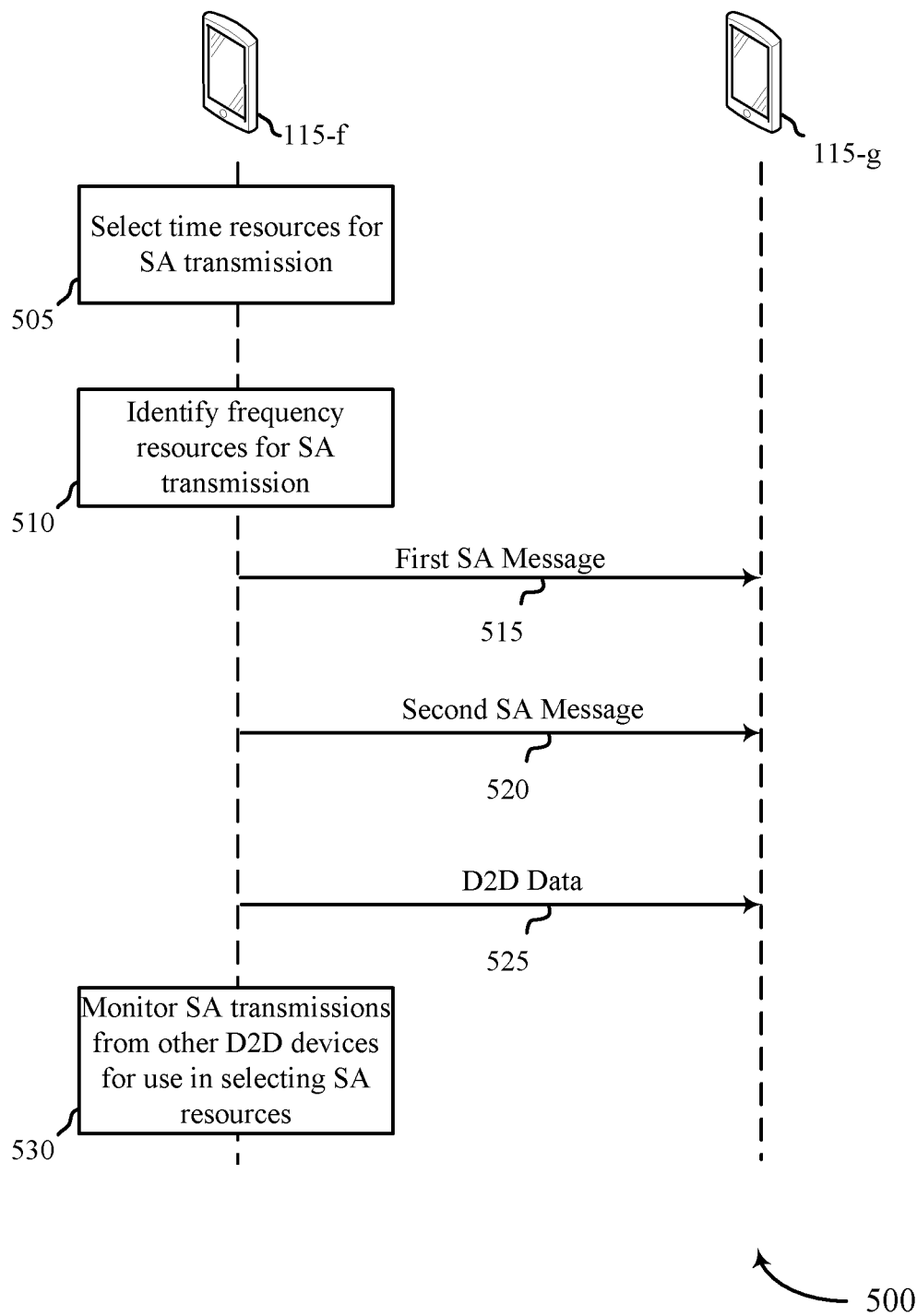
FIG. 5 illustrates an example of another process flow that supports scheduling assignment transmissions in device-to-device communications in accordance with various aspects of the present disclosure.

FIG. 5 illustrates an example of a process flow 500 for SA transmissions in D2D communications in accordance with various aspects of the present disclosure. Process flow 500 may include a first UE 115-f and a second UE 115-g, which may be examples of UEs 115 described with reference to FIGS. 1-4.

The first UE 115-f, at block 505, may select time resources for SA transmissions. The first UE 115-f, when selecting time resources, may select, from an entire block of time resources, a subset of the time resources for transmitting an SA. The first UE 115-f may then identify a predefined relationship between the block of time resources and the SA transmissions. The predefined relationship may provide various parameters used for the SA transmissions. The first UE 115-f may then, at block 510, identify frequency resources for the SA transmissions, such as in a manner as discussed above. The first UE 115-f may then transmit first SA message 515 to second UE 115-g. As mentioned above, in some examples, multiple SA transmissions may be transmitted, using different time and/or frequency resources, and the first UE 115-f may transmit second SA message 520 to second UE 115-g. The multiple SA transmissions may be transmitted according to the predefined relationship between the SA transmissions and the block of time resources. The second SA message 520 may be a retransmission of first SA message 515, for example. In some examples, the first SA message 515 and second SA message 520 may include a bitmap indicating time resources following the SA transmission that are to be used for the D2D data transmissions 525. In some examples the bitmap applies to the first subframe following the second SA message 520. In some examples the bitmap comprises a defined number of bits, and the transmission of the bitmap may be repeated when the number of transmissions extend beyond time resources identified in the bitmap. In some examples the bitmap applies an offset after the second SA message 520 for initiation of transmissions that are to be used to transmit the D2D data 525.

The first UE 115-f may detect other SA transmissions of other D2D devices, as indicated at block 530, such that selecting the time resources for transmitting future SA messages includes selecting resources other than resources indicated by the other SA transmissions. In some examples the D2D data transmissions and SA transmissions are V2V communications. The predefined relationship may be based on the other SA transmissions, e.g., the SA transmissions may be selected to avoid collisions.

Figure 6:
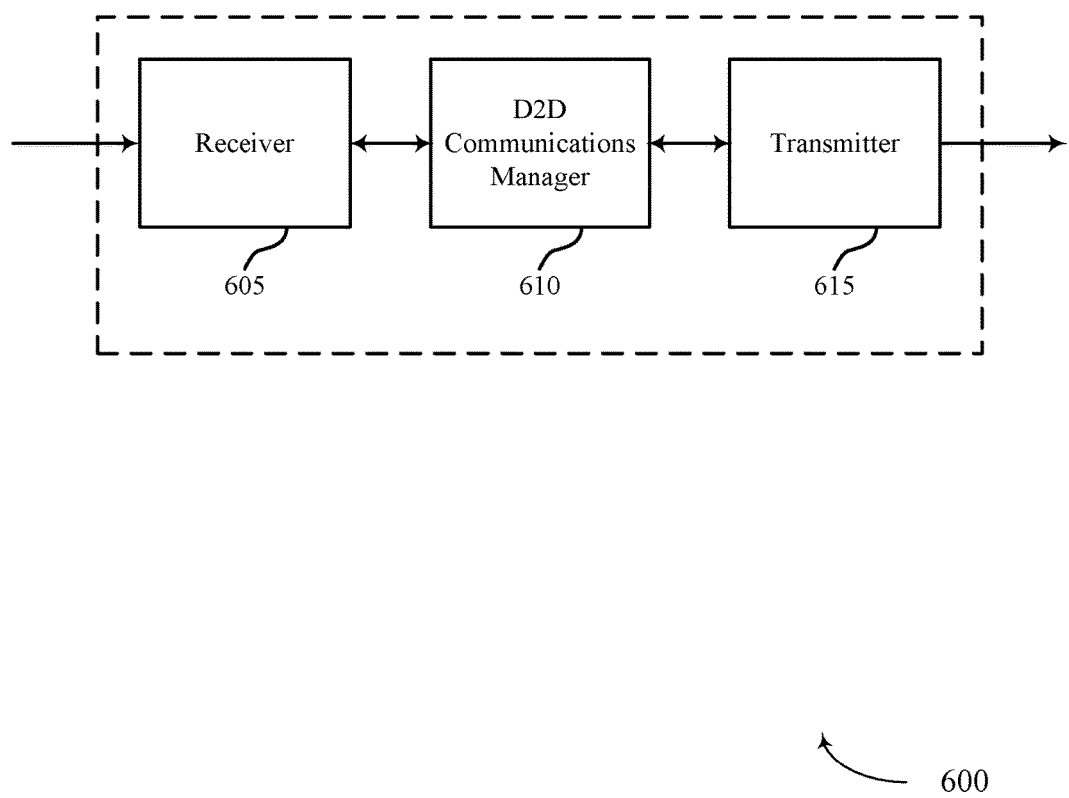
FIGS. 6-8 show block diagrams of a wireless device that supports scheduling assignment transmissions in device-to-device communications in accordance with various aspects of the present disclosure.

FIG. 6 shows a block diagram of a wireless device 600 configured for SA transmissions in D2D communications in accordance with various aspects of the present disclosure. Wireless device 600 may be an example of aspects of a UE 115 described with reference to FIGS. 1-5. Wireless device 600 may include a receiver 605, a D2D communications manager 610, or a transmitter 615. Wireless device 600 may also include a processor. Each of these components may be in communication with each other.

The receiver 605 may receive information such as packets, user data, or control information associated with various information channels (e.g., control channels, data channels, and information related to SA transmissions in D2D communications, etc.). Information may be passed on to the D2D communications manager 610, and to other components of wireless device 600.

The D2D communications manager 610 may identify a block of time resources for D2D data transmissions and SA transmissions, identify a predefined relationship between the block of time resources and the SA transmissions, in the absence of periodic SA transmissions, select, from the entire block of time resources, a subset of the time resources for transmitting an SA, and transmit the SA transmissions using the subset of the time resources and in accordance with the predefined relationship.

The transmitter 615 may transmit signals received from other components of wireless device 600. In some examples, the transmitter 615 may be collocated with the receiver 605 in a transceiver module. The transmitter 615 may include a single antenna, or it may include a plurality of antennas.

Figure 7:
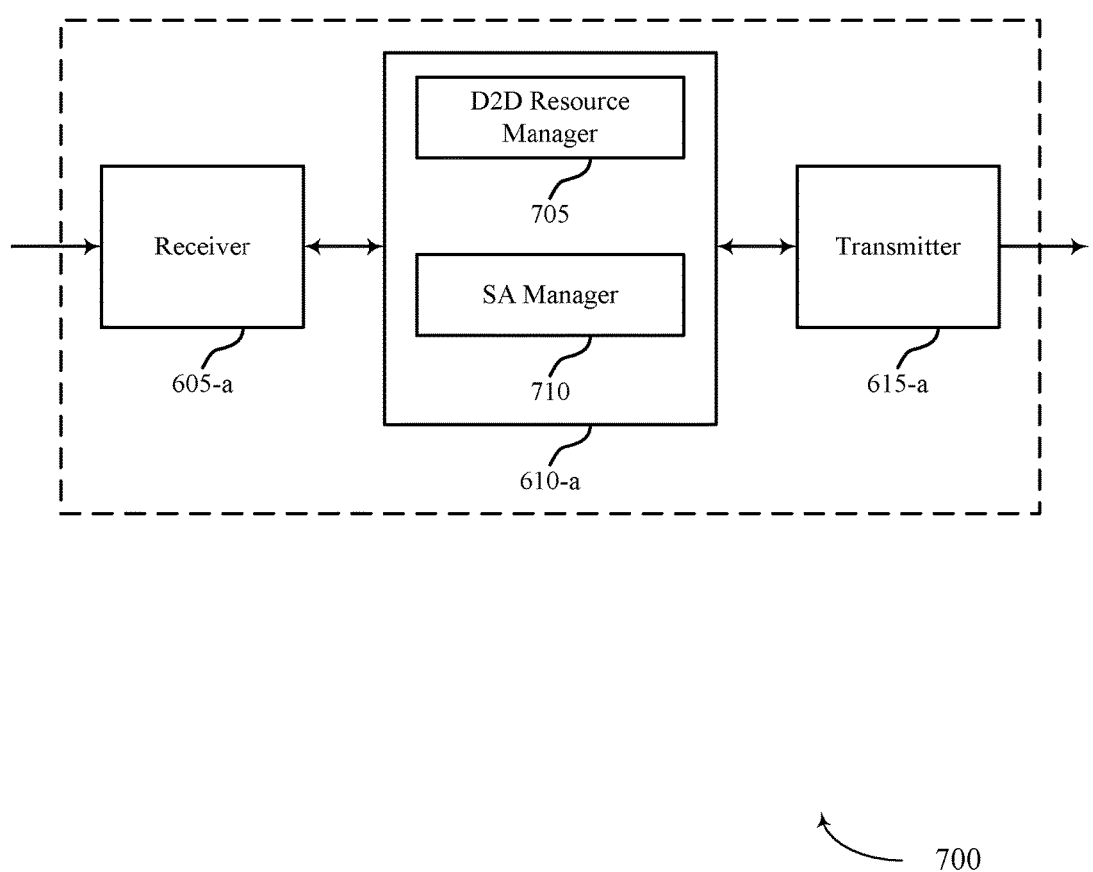

FIG. 7 shows a block diagram of a wireless device 700 for SA transmissions in D2D communications in accordance with various aspects of the present disclosure. Wireless device 700 may be an example of aspects of a wireless device 600 or a UE 115 described with reference to FIGS. 1-6. Wireless device 700 may include a receiver 605-a, a D2D communications manager 610-a, or a transmitter 615-a. Wireless device 700 may also include a processor. Each of these components may be in communication with each other. The D2D communications manager 610-a may also include a D2D resource manager 705, and an SA manager 710.

The receiver 605-a may receive information which may be passed on to D2D communications manager 610-a, and to other components of wireless device 700. The D2D communications manager 610-a may perform the operations described with reference to FIG. 6. The transmitter 615-a may transmit signals received from other components of wireless device 700.

The D2D resource manager 705 may identify a block of time resources for D2D data transmissions and SA transmissions, and identify a predefined relationship between the block of time resources and the SA transmissions, in the absence of periodic SA transmissions, as described with reference to FIGS. 2-5. The D2D resource manager 705 may also identify a set of frequency resources for the D2D data transmissions and the SA transmissions, and select a subset of the frequency resources for transmitting the SA, which may be located within defined segments of the set of frequency resources. In some examples, the subset of frequency resources comprises a first subset of frequency resources for transmitting a first SA transmission and a second subset of frequency resources for transmitting a second SA transmission. In some examples, the second subset of frequency resources may be determined based at least in part on a defined relationship between the first subset of frequency resources and the second set of frequency resources. In some examples, the set of frequency resources comprises a plurality of frequency sub-bands and the first subset of frequency resources are located in a first subset of the plurality of frequency sub-bands, and the second subset of frequency resources are located in a second subset of the plurality of frequency sub-bands that may be different than the first subset of the plurality of frequency sub-bands. In some examples, the set of frequency resources comprises a plurality of resource blocks and the first subset of frequency resources are located in a first subset of the plurality of resource blocks, and the second subset of frequency resources are located in a second subset of the plurality of resource blocks that may be different than the first subset of the plurality of resource blocks. In some examples, the first subset of frequency resources are located in even-numbered resource blocks and the second subset of frequency resources are located in odd-numbered resource blocks.

The SA manager 710 may select, from the entire block of time resources, a subset of the time resources for transmitting an SA and transmit the SA transmissions using the subset of time resources and in accordance with the predefined relationship as described with reference to FIGS. 2-5. The SA manager 710 may also transmit the first SA transmission using the first subset of frequency resources. The SA manager 710 may also transmit the second SA transmission using the second subset of frequency resources. In some examples, the second SA transmission may be a retransmission of the first SA transmission. The SA manager 710 may also transmit the SA, wherein the SA includes a bitmap indicating time resources following the SA transmission that are to be used for the D2D data transmissions. In some examples, the bitmap applies to the first subframe following a last SA transmission. In some examples, the bitmap comprises a defined number of bits, and the transmission of the bitmap may be repeated when the number of transmissions extend beyond time resources identified in the bitmap. In some examples, the bitmap applies an offset after a last SA transmission for initiation of transmissions that are to be used to transmit the D2D data. In some examples, the SA indicates a number of transmissions of the D2D data and the bitmap indicates time resources for each of the transmissions of the D2D data. In some examples, the predefined relationship may be based on the resources indicated by the other SA transmissions, may be signaled by a base station, or both.

Figure 8:
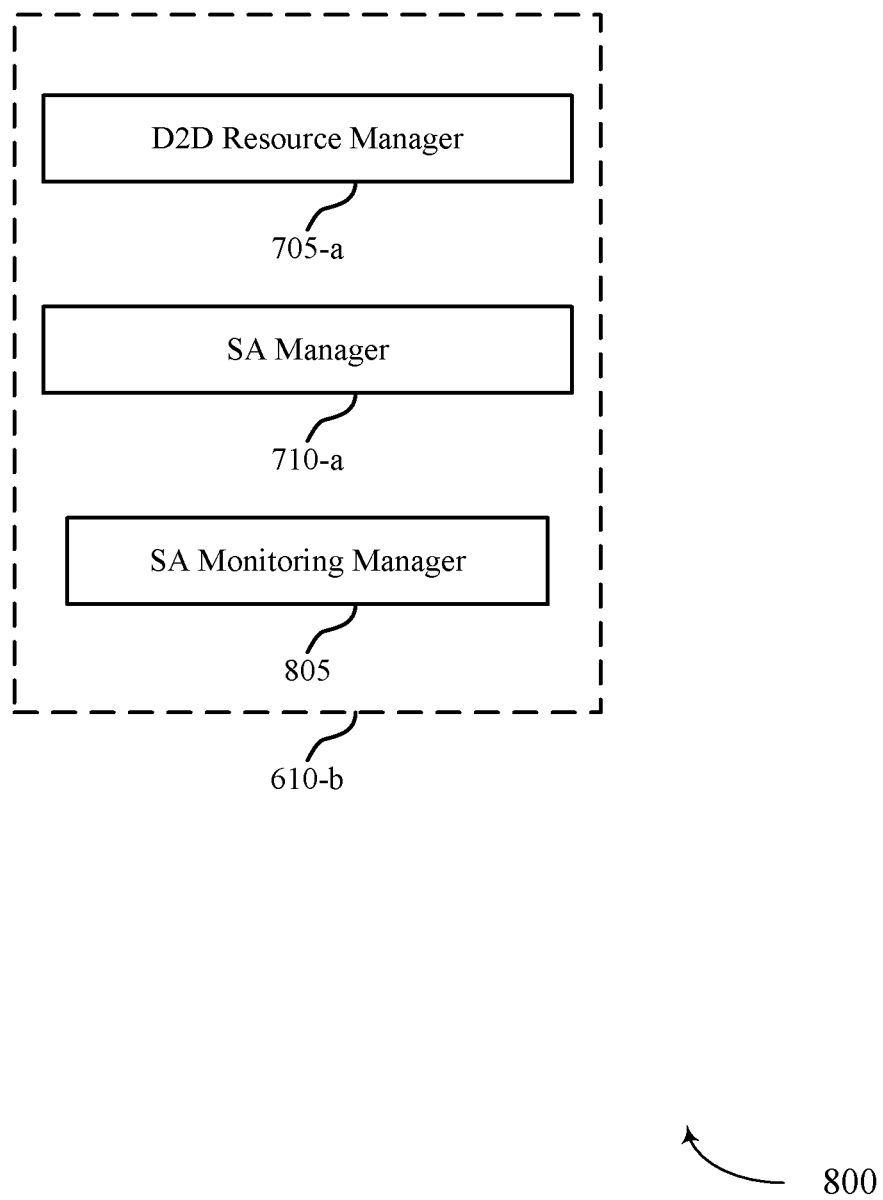

FIG. 8 shows a block diagram 800 of a D2D communications manager 610-b which may be a component of a wireless device 600 or a wireless device 700 for SA transmissions in D2D communications in accordance with various aspects of the present disclosure. The D2D communications manager 610-b may be an example of aspects of a D2D communications manager 610 described with reference to FIGS. 6-7. The D2D communications manager 610-b may include a D2D resource manager 705-a, and an SA manager 710-a. Each of these modules may perform the functions described with reference to FIG. 7. The D2D communications manager 610-b may also include an SA monitoring manager 805.

The SA monitoring manager 805 may detect other SA transmissions of at least one D2D UE, and wherein selecting the subset of the time resources for transmitting the SA comprises selecting resources other than resources indicated by the other SA transmissions as described with reference to FIGS. 2-5. In some examples, the predefined relationship may be based on the other SA transmissions. The D2D communications manager 610-b may be configured such that the D2D data transmissions and SA transmissions are V2V communications as described with reference to FIGS. 2-5.

Figure 9:
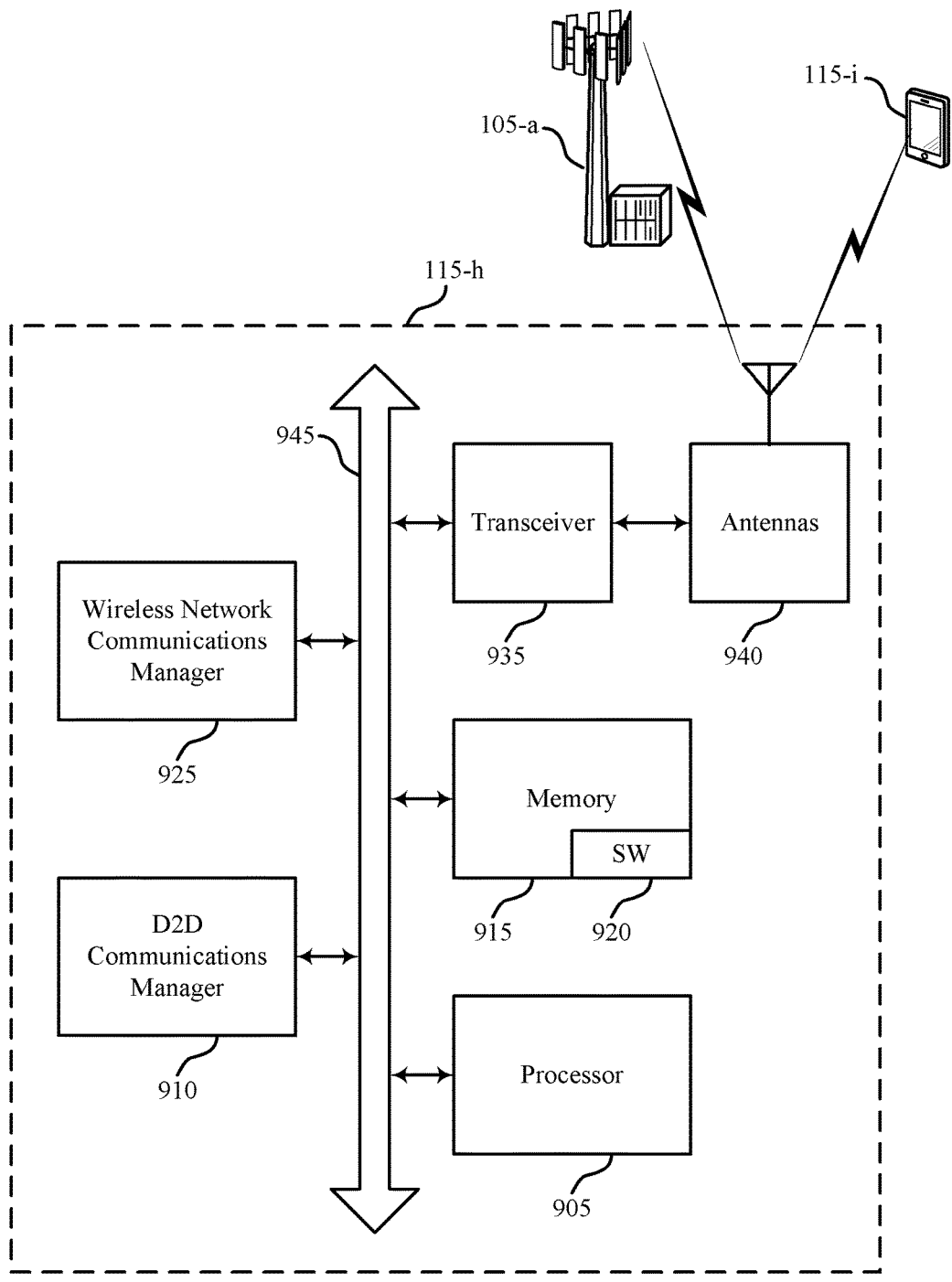
FIG. 9 illustrates a block diagram of a system including a user equipment that supports scheduling assignment transmissions in device-to-device communications in accordance with various aspects of the present disclosure.

FIG. 9 shows a diagram of a system 900 including a UE 115-h configured for SA transmissions in D2D communications in accordance with various aspects of the present disclosure. System 900 may include UE 115-h, which may be an example of a wireless device 600, a wireless device 700, or a UE 115 described with reference to FIGS. 1-8. UE 115-h may include a D2D communications manager 910, which may be an example of a D2D communications manager 610 described with reference to FIGS. 6-8. UE 115-h may also include a wireless network communications manager 925. UE 115-h may also include components for bi-directional voice and data communications including components for transmitting communications and components for receiving communications. For example, UE 115-h may communicate bi-directionally with UE 115-i or base station 105-a.

UE 115-h may also include a processor 905, and memory 915 (including software (SW)) 920, a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-h may include a single antenna 940, UE 115-h may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., scheduling assignment transmissions in device-to-device communications, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an application specific integrated circuit (ASIC), etc.)

The components of wireless device 600, wireless device 700, the UE 115-h, and D2D communications manager 610 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
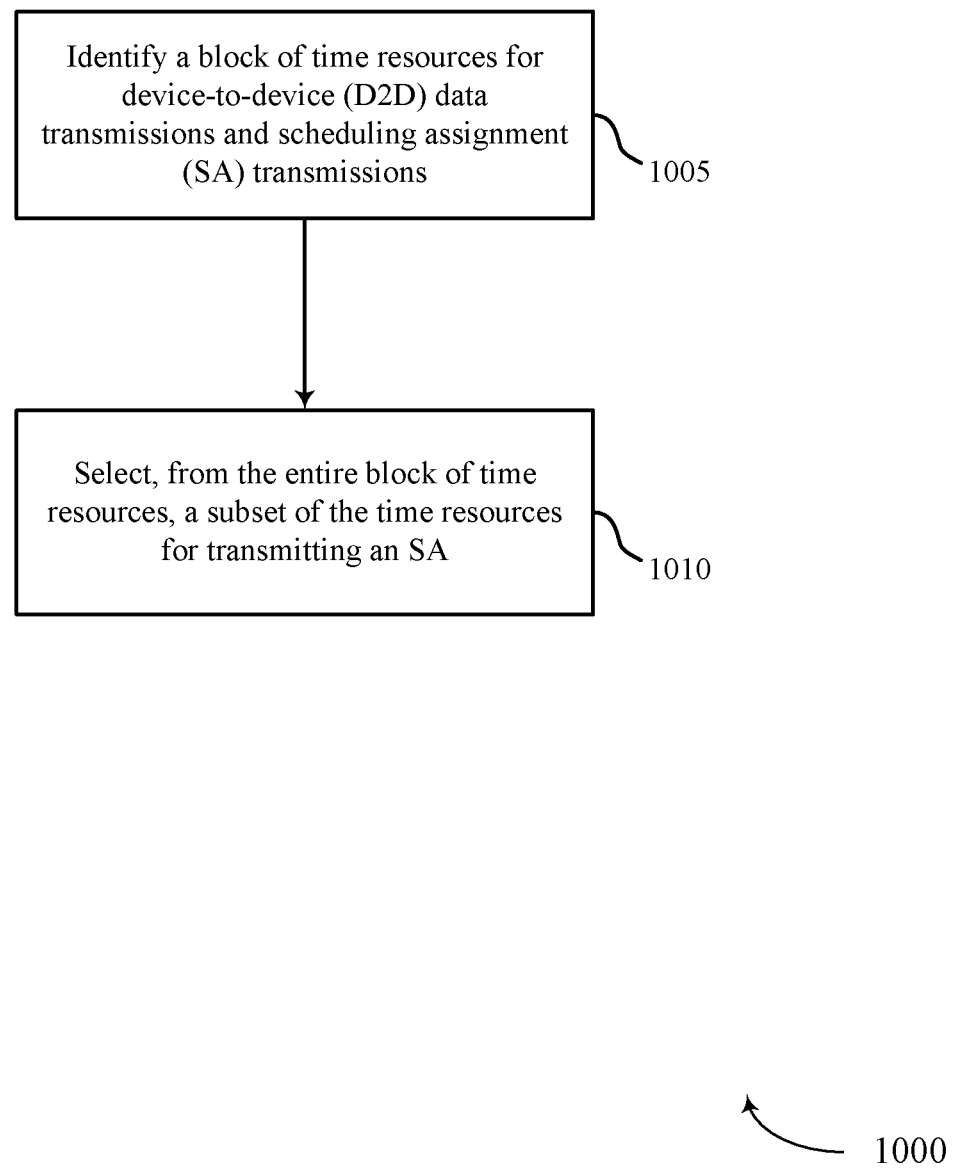
FIGS. 10-14 illustrate methods for scheduling assignment transmissions in device-to-device communications in accordance with various aspects of the present disclosure.

FIG. 10 shows a flowchart illustrating a method 1000 for SA transmissions in D2D communications in accordance with various aspects of the present disclosure. The operations of method 1000 may be implemented by a UE 115, a wireless device 600, or a wireless device 700, or its components, as described with reference to FIGS. 1-9. For example, the operations of method 1000 may be performed by the D2D communications manager 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1005, the UE 115 may identify a block of time resources for D2D data transmissions and SA transmissions as described with reference to FIGS. 2-5. In certain examples, the operations of block 1005 may be performed by the D2D resource manager 705 as described with reference to FIG. 7.

At block 1010, the UE 115 may select, from the entire block of time resources, a subset of the time resources for transmitting an SA as described with reference to FIGS. 2-5. In certain examples, the operations of block 1010 may be performed by the SA manager 710 as described with reference to FIG. 7.

Figure 11:
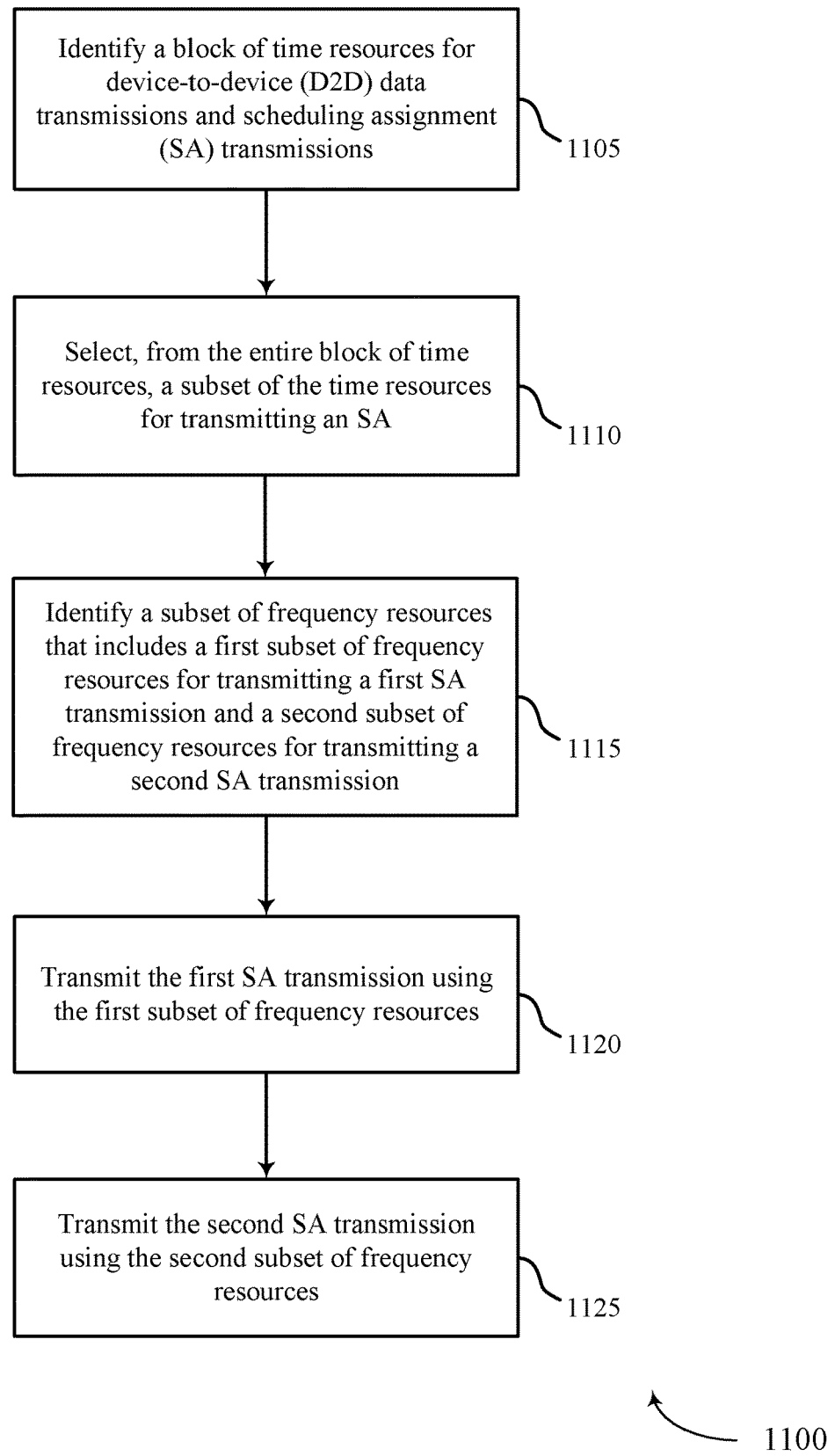

FIG. 11 shows a flowchart illustrating a method 1100 for SA transmissions in D2D communications in accordance with various aspects of the present disclosure. The operations of method 1100 may be implemented by a wireless device 600, a wireless device 700, and a UE 115, or its components, as described with reference to FIGS. 1-9. For example, the operations of method 1100 may be performed by the D2D communications manager 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1100 may also incorporate aspects of method 1000 of FIG. 10.

At block 1105, the UE 115 may identify a block of time resources for D2D data transmissions and SA transmissions as described with reference to FIGS. 2-5. In certain examples, the operations of block 1105 may be performed by the D2D resource manager 705 as described with reference to FIG. 7.

At block 1110, the UE 115 may select, from the entire block of time resources, a subset of the time resources for transmitting an SA as described with reference to FIGS. 2-5. In certain examples, the operations of block 1110 may be performed by the SA manager 710 as described with reference to FIG. 7.

At block 1115, the UE 115 may identify a subset of frequency resources that includes a first subset of frequency resources for transmitting a first SA transmission and a second subset of frequency resources for transmitting a second SA transmission as described with reference to FIGS. 2-5. In certain examples, the operations of block 1115 may be performed by the SA manager 710 as described with reference to FIG. 7.

At block 1120, the UE 115 may transmit the first SA transmission using the first subset of frequency resources as described with reference to FIGS. 2-5. In certain examples, the operations of block 1120 may be performed by the SA manager 710 as described with reference to FIG. 7.

At block 1125, the UE 115 may transmit the second SA transmission using the second subset of frequency resources as described with reference to FIGS. 2-5. In certain examples, the operations of block 1125 may be performed by the SA manager 710 as described with reference to FIG. 7.

Figure 12:
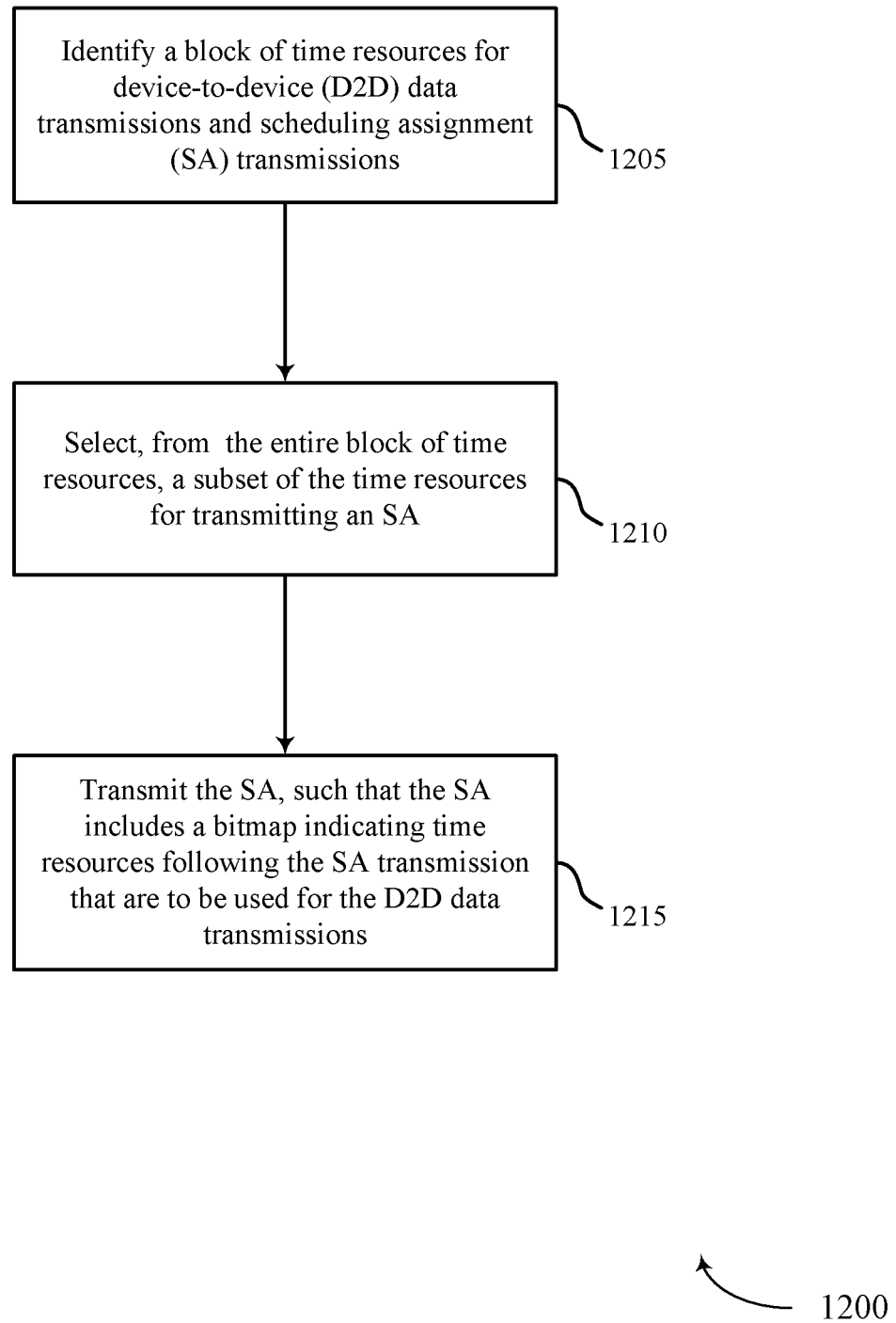

FIG. 12 shows a flowchart illustrating a method 1200 for SA transmissions in D2D communications in accordance with various aspects of the present disclosure. The operations of method 1200 may be implemented by a wireless device 600, a wireless device 700, and a UE 115, or its components, as described with reference to FIGS. 1-9. For example, the operations of method 1200 may be performed by the D2D communications manager 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of methods 1000, and 1100 of FIGS. 10-11.

At block 1205, the UE 115 may identify a block of time resources for D2D data transmissions and SA transmissions as described with reference to FIGS. 2-5. In certain examples, the operations of block 1205 may be performed by the D2D resource manager 705 as described with reference to FIG. 7.

At block 1210, the UE 115 may select, from the entire block of time resources, a subset of the time resources for transmitting an SA as described with reference to FIGS. 2-5. In certain examples, the operations of block 1210 may be performed by the SA manager 710 as described with reference to FIG. 7.

At block 1215, the UE 115 may transmit the SA, wherein the SA includes a bitmap indicating time resources following the SA transmission that are to be used for the D2D data transmissions as described with reference to FIGS. 2-5. In certain examples, the operations of block 1215 may be performed by the SA manager 710 as described with reference to FIG. 7.

Figure 13:
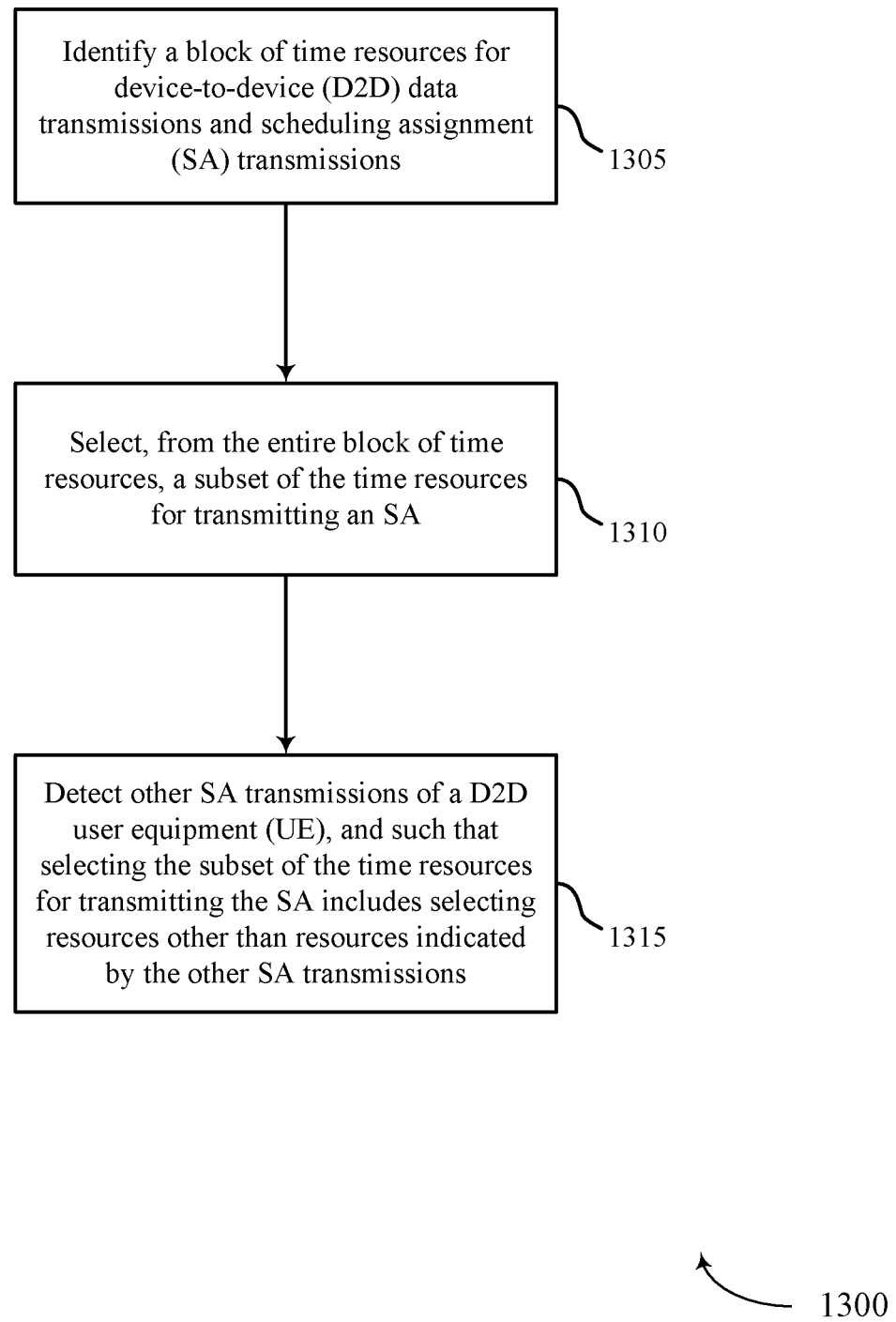

FIG. 13 shows a flowchart illustrating a method 1300 for SA transmissions in D2D communications in accordance with various aspects of the present disclosure. The operations of method 1300 may be implemented by a wireless device 600, a wireless device 700, and a UE 115, or its components, as described with reference to FIGS. 1-9. For example, the operations of method 1300 may be performed by the D2D communications manager 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of methods 1000, 1100, and 1200 of FIGS. 10-12.

At block 1305, the UE 115 may identify a block of time resources for D2D data transmissions and SA transmissions as described with reference to FIGS. 2-5. In certain examples, the operations of block 1305 may be performed by the D2D resource manager 705 as described with reference to FIG. 7.

At block 1310, the UE 115 may select, from the entire block of time resources, a subset of the time resources for transmitting an SA as described with reference to FIGS. 2-5. In certain examples, the operations of block 1310 may be performed by the SA manager 710 as described with reference to FIG. 7.

At block 1315, the UE 115 may detect other SA transmissions of at least one D2D UE, and wherein selecting the subset of the time resources for transmitting the SA comprises selecting resources other than resources indicated by the other SA transmissions as described with reference to FIGS. 2-5. In certain examples, the operations of block 1315 may be performed by the SA monitoring manager 805 as described with reference to FIG. 8.

Figure 14:
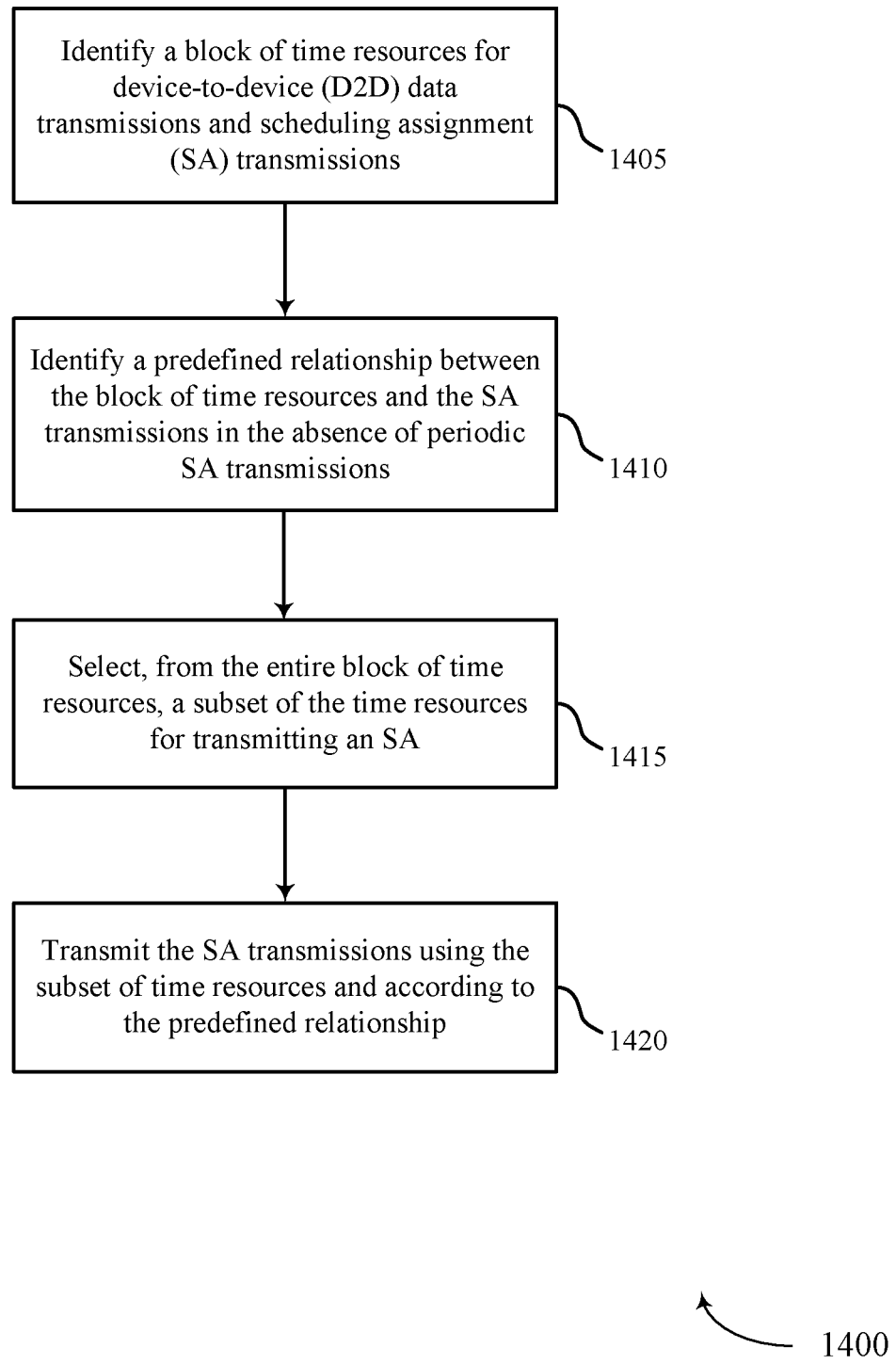

FIG. 14 shows a flowchart illustrating a method 1400 for SA transmissions in D2D communications in accordance with various aspects of the present disclosure. The operations of method 1400 may be implemented by a wireless device 600, a wireless device 700, and a UE 115, or its components, as described with reference to FIGS. 1-9. For example, the operations of method 1400 may be performed by the D2D communications manager 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of methods 1000, 1100, 1200, and 1300 of FIGS. 10-13.

At block 1405, the UE 115 may identify a block of time resources for D2D data transmissions and SA transmissions as described with reference to FIGS. 2-5. In certain examples, the operations of block 1405 may be performed by the D2D resource manager 705 as described with reference to FIG. 7.

At block 1410, the UE 115 may identify a predefined relationship between the block of time resources and the SA transmissions, in the absence of periodic SA transmissions, as described with reference to FIGS. 2-5. In certain examples, the operations of block 1410 may be performed by the D2D resource manager 705 as described with reference to FIG. 7.

At block 1415, the UE 115 may select, from the entire block of time resources, a subset of the time resources for transmitting an SA as described with reference to FIGS. 2-5. In certain examples, the operations of block 1310 may be performed by the SA manager 710 as described with reference to FIG. 7.

At block 1420, the UE 115 may transmit the SA transmissions using the subset of time resources and according to the predefined relationship as described with reference to FIGS. 2-5. In certain examples, the operations of block 1420 may be performed by the SA monitoring manager 805 as described with reference to FIG. 8.

Thus, methods 1000, 1100, 1200, 1300, and 1400 may provide for scheduling assignment transmissions in device-to-device communications. It should be noted that methods 1000-1400 describe possible implementation, and that the operations and the steps may be rearranged or otherwise modified such that other implementations are possible. In some examples, aspects from two or more of the methods 1000-1400 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and Long Term Evolution (LTE)-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying a block of time resources for device-to-device (D2D) data transmissions and scheduling assignment (SA) transmissions;
   identifying a predefined relationship between the block of time resources and the SA transmissions in the absence of periodic SA transmissions;
   selecting, from the entire block of time resources, a subset of the time resources for transmitting an SA; and
   transmitting the SA transmissions using the subset of the time resources and according to the predefined relationship, wherein the SA includes a bitmap indicating time resources following the SA transmission that are to be used for the D2D data transmissions.

2. The method of claim 1, further comprising:
   identifying a set of frequency resources for the D2D data transmissions and the SA transmissions, and
   selecting a subset of the frequency resources for transmitting the SA, wherein the subset of the frequency resources are located within defined segments of the set of frequency resources.

3. The method of claim 2, wherein the subset of frequency resources comprises a first subset of frequency resources for transmitting a first SA transmission and a second subset of frequency resources for transmitting a second SA transmission.

4. The method of claim 3, further comprising:
   transmitting the first SA transmission using the first subset of frequency resources; and
   transmitting the second SA transmission using the second subset of frequency resources.

5. The method of claim 4, wherein the second SA transmission is a retransmission of the first SA transmission.

6. The method of claim 3, wherein the second subset of frequency resources is determined based on a defined relationship between the first subset of frequency resources and the second subset of frequency resources.

7. The method of claim 3, wherein the set of frequency resources comprises a plurality of frequency sub-bands and the first subset of frequency resources are located in a first subset of the plurality of frequency sub-bands, and wherein the second subset of frequency resources are located in a second subset of the plurality of frequency sub-bands that is different than the first subset of the plurality of frequency sub-bands.

8. The method of claim 3, wherein the set of frequency resources comprises a plurality of resource blocks and the first subset of frequency resources are located in a first subset of the plurality of resource blocks, and wherein the second subset of frequency resources are located in a second subset of the plurality of resource blocks that is different than the first subset of the plurality of resource blocks.

9. The method of claim 8, wherein the first subset of frequency resources are located in even-numbered resource blocks and the second subset of frequency resources are located in odd-numbered resource blocks.

10. The method of claim 1, wherein the bitmap applies to a first subframe following a last SA transmission.

11. The method of claim 1, wherein the bitmap applies an offset after a last SA transmission for initiation of transmissions that are to be used to transmit the D2D data.

12. The method of claim 1, wherein the SA indicates a number of transmissions of the D2D data and the bitmap indicates time resources for each of the transmissions of the D2D data.

13. The method of claim 1, wherein the bitmap comprises a defined number of bits, and wherein transmission of the bitmap is repeated when a number of transmissions extend beyond time resources identified in the bitmap.

14. The method of claim 1, further comprising:
detecting other SA transmissions of at least one D2D user equipment (UE), and
wherein selecting the subset of the time resources for transmitting the SA comprises selecting resources other than resources indicated by the other SA transmissions.

15. The method of claim 14, wherein identifying the predefined relationship between the block of time resources and the SA transmissions is based at least in part on the resources indicated by the other SA transmissions.

16. The method of claim 1, wherein the predefined relationship between the block of time resources and the SA transmissions is signaled by a base station.

17. The method of claim 1, wherein the D2D data transmissions and SA transmissions are vehicle-to-vehicle (V2V) communications.

18. An apparatus for communication, comprising:
a processor;
memory in electronic communication with the processor; and
instructions stored in the memory; wherein the instructions are executable by the processor to:
identify a block of time resources for device-to-device (D2D) data transmissions and scheduling assignment (SA) transmissions;
identify a predefined relationship between the block of time resources and the SA transmissions in the absence of periodic SA transmissions;
select, from the entire block of time resources, a subset of the time resources for transmitting an SA; and
transmit the SA transmissions using the subset of the time resources and according to the predefined relationship, wherein the SA includes a bitmap indicating time resources following the SA transmission that are to be used for the D2D data transmissions.

19. The apparatus of claim 18, wherein the instructions are executable by the processor to:
identify a set of frequency resources for the D2D data transmissions and the SA transmissions, and selecting a subset of the frequency resources for transmitting the SA, wherein the subset of the frequency resources are located within defined segments of the set of frequency resources.

20. The apparatus of claim 19, wherein the subset of frequency resources comprises a first subset of frequency resources for transmitting a first SA transmission and a second subset of frequency resources for transmitting a second SA transmission.

21. The apparatus of claim 20, wherein the instructions are executable by the processor to:
transmit the first SA transmission using the first subset of frequency resources; and
transmit the second SA transmission using the second subset of frequency resources.

22. The apparatus of claim 21, wherein the second SA transmission is a retransmission of the first SA transmission.

23. The apparatus of claim 20, wherein the second subset of frequency resources is determined based on a defined relationship between the first subset of frequency resources and the second subset of frequency resources.

24. The apparatus of claim 20, wherein the set of frequency resources comprises a plurality of frequency sub-bands and the first subset of frequency resources are located in a first subset of the plurality of frequency sub-bands, and wherein the second subset of frequency resources are located in a second subset of the plurality of frequency sub-bands that is different than the first subset of the plurality of frequency sub-bands.

25. The apparatus of claim 20, wherein the set of frequency resources comprises a plurality of resource blocks and the first subset of frequency resources are located in a first subset of the plurality of resource blocks, and wherein the second subset of frequency resources are located in a second subset of the plurality of resource blocks that is different than the first subset of the plurality of resource blocks.

26. The apparatus of claim 25, wherein the first subset of frequency resources are located in even-numbered resource blocks and the second subset of frequency resources are located in odd-numbered resource blocks.

27. A non-transitory computer-readable medium storing code for wireless communication, the code comprising instructions executable to:
identify a block of time resources for device-to-device (D2D) data transmissions and scheduling assignment (SA) transmissions;
identify a predefined relationship between the block of time resources and the SA transmissions in the absence of periodic SA transmissions;
select, from the entire block of time resources, a subset of the time resources for transmitting an SA; and
transmit the SA transmissions using the subset of the time resources and according to the predefined relationship, wherein the SA includes a bitmap indicating time resources following the SA transmission that are to be used for the D2D data transmissions.

* * * * *